United States Patent Office 3,207,053
Patented Sept. 21, 1965

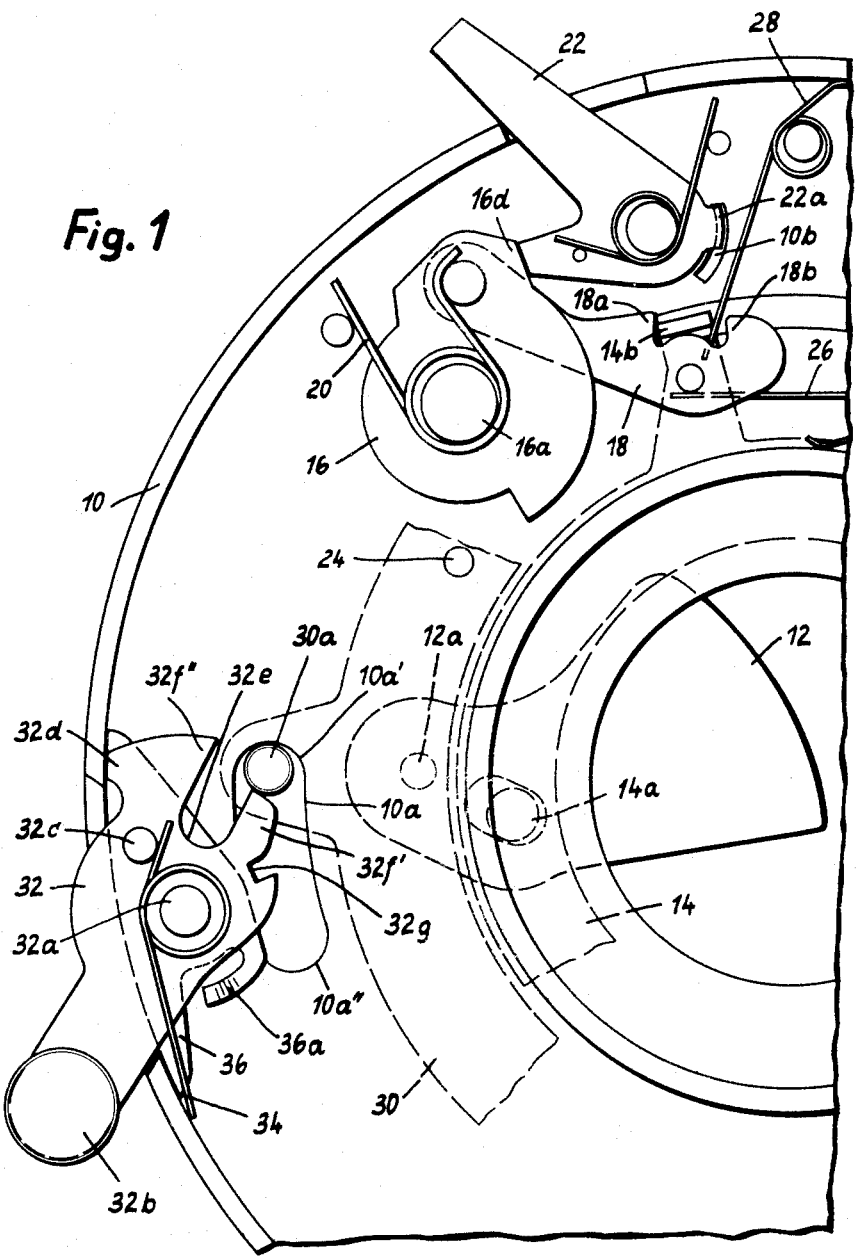

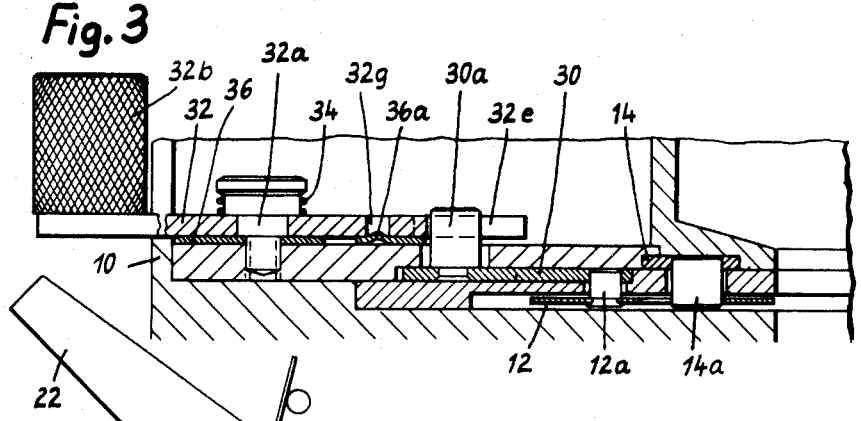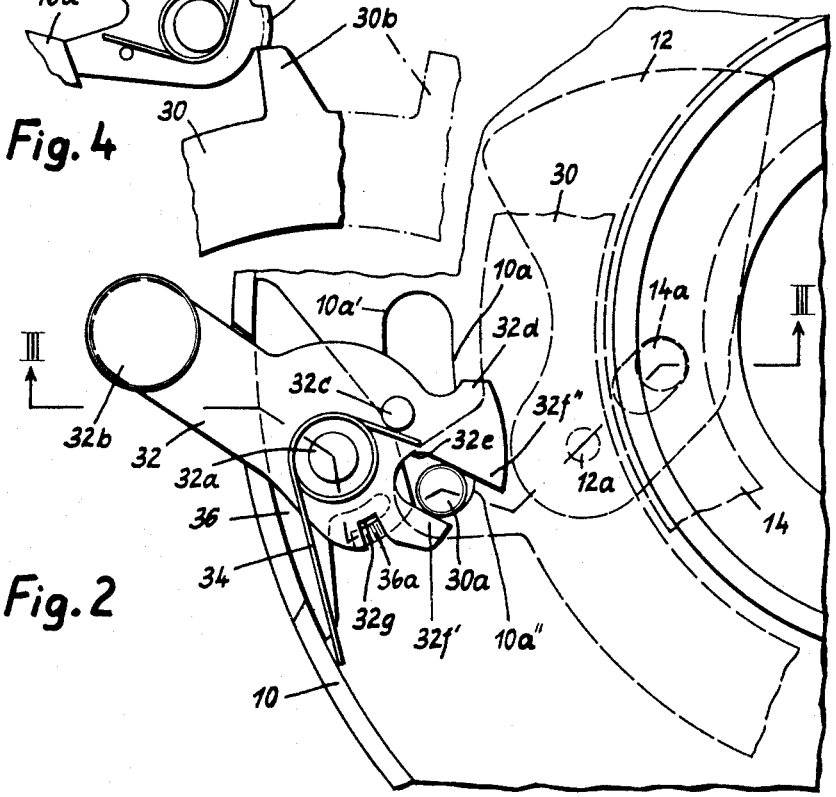

3,207,053
PHOTOGRAPHIC SHUTTER ASSEMBLY
Franz Singer, Munich, Germany, assignor to Compur-Werk Gesellschaft mit beschrankter Haftung & Company, Munich, Germany, a company of Germany
Filed May 7, 1963, Ser. No. 278,543
Claims priority, application Germany, May 28, 1962, C 27,111
3 Claims. (Cl. 95—63)

The present invention relates to a photographic shutter assembly and more particularly to an assembly wherein means is provided to open the shutter for the purpose of inspecting the image of the photographic subject, such means being independent of the means for producing the exposure.

Shutters used for special or studio cameras may be provided with means to open the shutter to permit the interim inspection of the image of the photographic subject independently of the condition of the camera (cocked or at rest) at the time selected for the inspection. According to the present invention there are provided two rings for moving the shutter blades, one of these rings being the drawing ring and being operated in the usual way to produce the exposure while the other ring is the opening ring and is operated by a separate means to permit the interim inspection referred to. Means is provided to prevent the inadvertent movement of the opening ring so that the movements of the drawing ring during an exposure are not interfered with. This means comprises a recess on the opening lever, the recess being disposed between a pair of driving arms, an end portion of one of the driving arms forming an abutment engaging a pin on the opening ring to prevent movement of the ring when the lever is in the rest position. When the lever moves to the shutter open position, the pin on the ring engages the recess in the lever and the opening ring is rotated to open the shutter blades. Means is also provided to prevent faulty operation of the apparatus including spring means urging the opening lever to a rest position and a spring catch retaining the opening lever in a shutter open position. Thus the opening lever cannot assume an intermediate position between the rest position and the shutter open position.

An object of the present invention is to provide a photographic shutter assembly with means for opening the shutter for inspection of the image of the photographic subject, said means being independent of the means for producing the exposure.

Another object of the present invention is to provide a shutter opening lever which is spring urged to the rest position and which is provided with a spring latch for retaining the lever in the shutter open position.

Other objects and many of the attendant advantages of the present invention will become more readily apparent upon consideration of the following detailed specification in connection with the accompanying drawing wherein:

FIGURE 1 is a plan of part of a shutter assembly with certain parts nonessential to the present invention removed, FIGURE 2 is a fragmentary plan having parts of the assembly in another working position, FIGURE 3 is a cross section on the line III—III of FIGURE 2, and FIGURE 4 illustrates a detail of FIGURES 1 and 2.

The shutter assembly illustrated in FIGURE 1 is of a bladed type known per se, with its mechanism installed in a shutter housing 10. It has, for example, five shutter blades 12 which are mounted on pins 12a and can be given a reciprocatory movement, for opening and closing the objective aperture, by driving pins 14a of a shutter operating ring 14. The ring 14 is in turn actuated by a main driving member 16 and a crank 18 which is pivotally coupled thereto and cooperates with the bent-up end of an arm 14b of the main shutter operating means. The main driving member 16 has a cocking spindle 6a which projects rearwards out of the shutter housing and a power spring 20 which urges the main driving member in the clockwise direction. In the cocked condition of the parts illustrated in FIGURE 1, the main driving member is held firm by a trigger lever 22. After the latter has been operated, the main driving member moves under the action of its spring from the cocked position illustrated in FIGURE 1 in the clockwise direction toward the rest position, which is determined by a stationary stop pin 24 against which the nose 16d of the main driving member is applied. During this travel of the main driving member 16, which traverses an angle of about 150°, the crank 18 is first moved to the right, the cheek 18a thereof moving the arm 14b of the blade driving ring in the clockwise direction so as to open the blades 12. In the second phase of this run-down movement of the main driving member, the crank 18 is moved to the left again, and in this case its other cheek 18b moves the shutter operating ring 14 in the counterclockwise direction to close the blades back into their rest positions.

When the main driving member 16 is recocked by means of its spindle 16a, which for example may be coupled in known fashion with the film winding equipment of the camera, the main driving member moves in the counterclockwise direction into the cocked position. Since the crank cheek 18a in the rest position is out of engagement and in front of the arm 14b, a rightwards adjustment of the crank 18 during the first phase of the cocking movement will not affect the arm 14b of the shutter operating ring 14. The crank cheek 18a moreover slides, under the action of a spring 26, past the inner face of the arm 14b directed toward the center of the shutter, a further spring 28 holding the same in the rest position. During the second phase of the cocking movement the crank 18 again moves to the left until it re-assumes the position illustrated in FIGURE 1.

To allow for the shutter to be opened for interim inspection during focussing, for example when using a camera with a ground glass or focussing screen, a further ring 30 is provided. This ring 30 serves to move the blades during the exposure, the ring 30 accommodating the blade mounting pins 12a and therefore in the ensuing description being referred to as the blade mounting ring. By moving the blade mounting ring in the counterclockwise direction, the blades 12 can more or less be pivoted around the driving pins 14a for opening the light aperture for the purpose of interim inspection, while they are reclosed in response to the return of the ring in the clockwise direction. A manually-operable arrangement which will now be described in more detail is used to move the blade mounting ring 30.

A double-armed opening lever 32 is mounted about a fixed pivot at 32a in the shutter housing 10 and has a finger grip 32b projecting out of this housing. A return spring 34 is mounted around the pin 32a with one end bearing against the shutter housing 10 and the other against the side of a pin 32c on the opening lever 32. Consequently this spring urges the opening lever into a rest position determined by the application of a projection 32d thereof against the inside wall of the shutter housing 10. At the end thereof within the shutter housing, the opening lever 32 has a driving slot 32e defined between two radial driving arms 32f' and 32f'' of this lever. The arm 32f' is of a form such that, when in the rest position of FIGURE 1, it is located in front of a pin 30a on the blade mounting ring 30 and obstructs movement by the latter. The end portion of the arm 32f' forms an abutment portion which, in the rest position, positively bars said pin 30a and with it said mounting ring 30 from performing a shutter-opening movement.

Accommodated beneath the opening lever 32 is a leaf spring 36 which engages the mounting pin 32a and bears against the inner face of the shutter housing 10. A lug 36a on this leaf spring is of cam formation and this forms a resilient catch which, in a specific position thereof, can engage in a notch 32g in the opening lever 32 so as to act as a latch.

In the situation seen in FIGURE 1, the opening lever 32 is in its rest condition. Its driving arm 32f' is disposed in front of the driving pin 30a of the blade mounting ring 30, so that this pin is positively located between the driving arm 32f' and the end 10a' of a longitudinal slot 10a in the housing 10 of the shutter. The blade mounting ring is therefore prevented from moving in either direction. The opening and closing movements which are required for exposure are imparted to the blade 12 by the blade operating ring 14.

If it is required to open the shutter for interim inspection, the opening lever 32 is swung in the clockwise sense by hand from the position seen in FIGURE 1 into that shown in FIGURE 2. In the first phase of this movement, the arm 32f' of lever 32 first releases the pin 30a for movement. Shortly thereafter the arm 32f'' contacts and picks up the pin 30a and carries it along, so that the blade mounting ring 30 is also moved in the counterclockwise direction. During the further movement of the member 32, 30 the pin 30a drops into the slot 32e and is moved a distance by the opening lever 32 until it bears against the other end 10a'' of the slot 10a (FIGURE 2). In this position the blades 12 are fully opened for the interim inspection, and the shutter is held in this opened position by the fact that the locking lug 36a of the stationary leaf spring 36 engages in the catch 32g of the opening lever 32 in this particular operating position.

In the interim inspection position in FIGURE 2, an abutment lug 30b on the blade ring 30 is located in front of a lug 22a on the shutter release trigger 22 (FIGURE 4) which is bent over and extends rearwards through a slot 10b in the shutter housing 10, which makes a pivoting movement of the trip device impossible in this position. Thus the shutter release 22 is precluded from operation during the interim inspection (FIGURES 2 and 4) and the blade operating ring 14 from being moved inadvertently, such as might produce undesirable damage to the blades 12.

As soon as the photographic subject has been examined on the ground glass disc and the shutter is to be closed again, it is only necessary to press lightly on the opening lever 32 until the resilient locking lug 36a is pushed through by the latter. The opening lever 32 and the blade mounting ring 30 thereupon return to the rest position under the action of the return spring (FIGURE 4), the shutter being thereby closed and the blade mounting ring being locked, in the manner described above, against unwanted movement. The shutter release 22 is freed in this operative condition by the abutment lug 30b—as shown in dotted lines in FIGURE 4, thereby allowing the shutter to be tripped for an exposure.

It is clearly seen from the foregoing that there is a simple but nevertheless effective safety control of the blade mounting ring in its rest position by the construction of the opening mechanism in accordance with this invention. Consequently a return or safety spring for this ring—hitherto usual—is dispensed with. Moreover, simply by virtue of a positive engagement between the parts the blade mounting ring is prevented from inadvertent movement out of its rest position to interfere with the performance of the various required functions during the actual exposure procedure. Moreover, the fact that the opening lever can be detained only in its two end positions is a simple means of ensuring against a faulty operation of the opening means, that is to say an incomplete opening or closing of the shutter.

It should be stated that the driving pin 30a could be in the form of an eccentric which is setable for adjustment purposes, thus enabling the fitting between the parts 32f, 30a and 10a' to be accurately set in advantageous fashion during the assembly of the shutter.

Obviously many modifications and variations of the present invention are possible in light of the above teachings. What is claimed as new and is desired to be secured by Letters Patent is:

1. A photographic shutter comprising, in combination, a shutter housing, a first shutter blade driving ring rotatable in said housing, a plurality of shutter blades pivotally mounted on said first ring, a second shutter blade ring concentric with said first ring and rotatable in said housing, pins on said second ring engageable within slots in said shutter blades, a main operating member rotatable in said housing, spring means urging said member to an uncocked position, shutter trip means retaining said member in a cocked position, a crank connecting said main operating member with said second blade ring whereby upon release of said main operating member by said shutter trip lever, the blade ring is rotated to open and close the shutter blades, an opening lever pivoted on said housing, said opening lever having a pair of driving arms separated by a recess, a pin on said first blade ring, said pin being engaged with an end portion of one of said driving arms to prevent rotation of said blade ring when the opening lever is in a rest position, but when said opening lever is pivoted to a shutter open position, said pin engages said recess and the blade ring is rotated to open the shutter blades, and abutment on said first blade ring engageable with said shutter trip lever when the opening lever is pivoted to a shutter open position and spring means urging said opening lever to a rest position.

2. A photographic shutter according to claim 1 and further including a spring catch engaging said opening lever to retain said lever in a shutter open position.

3. A photographic shutter comprising, in combination, a pair of blade driving rings, a main driving means operatively connected with one of said rings to open and close the shutter for the exposure, and a manually operable opening lever projecting from the shutter housing, means on said opening lever co-operating with the other of said blade driving rings so as to drivingly couple said lever with said blade driving ring, and abutment means on said lever engageable with said ring in the rest position of said lever for preventing movement of said ring to an open shutter position, said means on said opening lever co-operating with the other of said blade driving rings comprising a pair of driving arms on said opening lever, a recess between said driving arms, said abutment means comprising an end portion of one of said driving arms, and a pin on said other blade driving ring engageable with said end portion in the rest position of the lever.

References Cited by the Examiner

UNITED STATES PATENTS

| 2,206,132 | 7/40 | Stewart | 95—62 |
|---|---|---|---|
| 2,344,382 | 3/44 | Aiken | 95—63 |
| 2,354,168 | 7/44 | Aiken | 95—63 |
| 2,527,781 | 10/50 | Willcox | 95—63 |
| 2,831,414 | 4/58 | Gorey | 95—63 |

NORTON ANSHER, *Primary Examiner.*

JOHN M. HORAN, *Examiner.*